Sept. 8, 1970 MITSUGI MIURA 3,527,026
APPARATUS FOR TREATING A GAS TO REMOVE IMPURITIES THEREFROM
Filed June 3, 1968 2 Sheets-Sheet 1
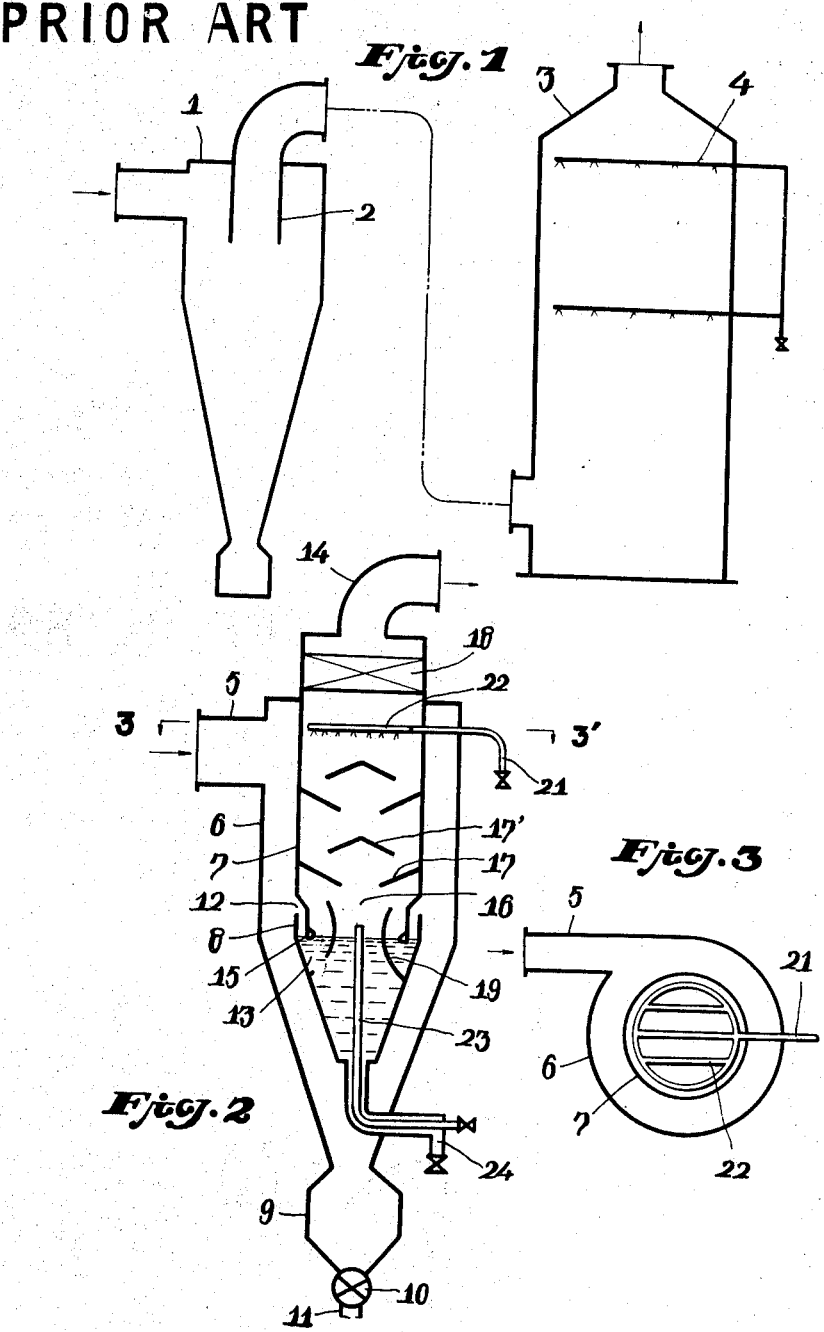
PRIOR ART
Mitsugi Miura
INVENTOR
by George B. Cuyper
BY
ATTORNEY

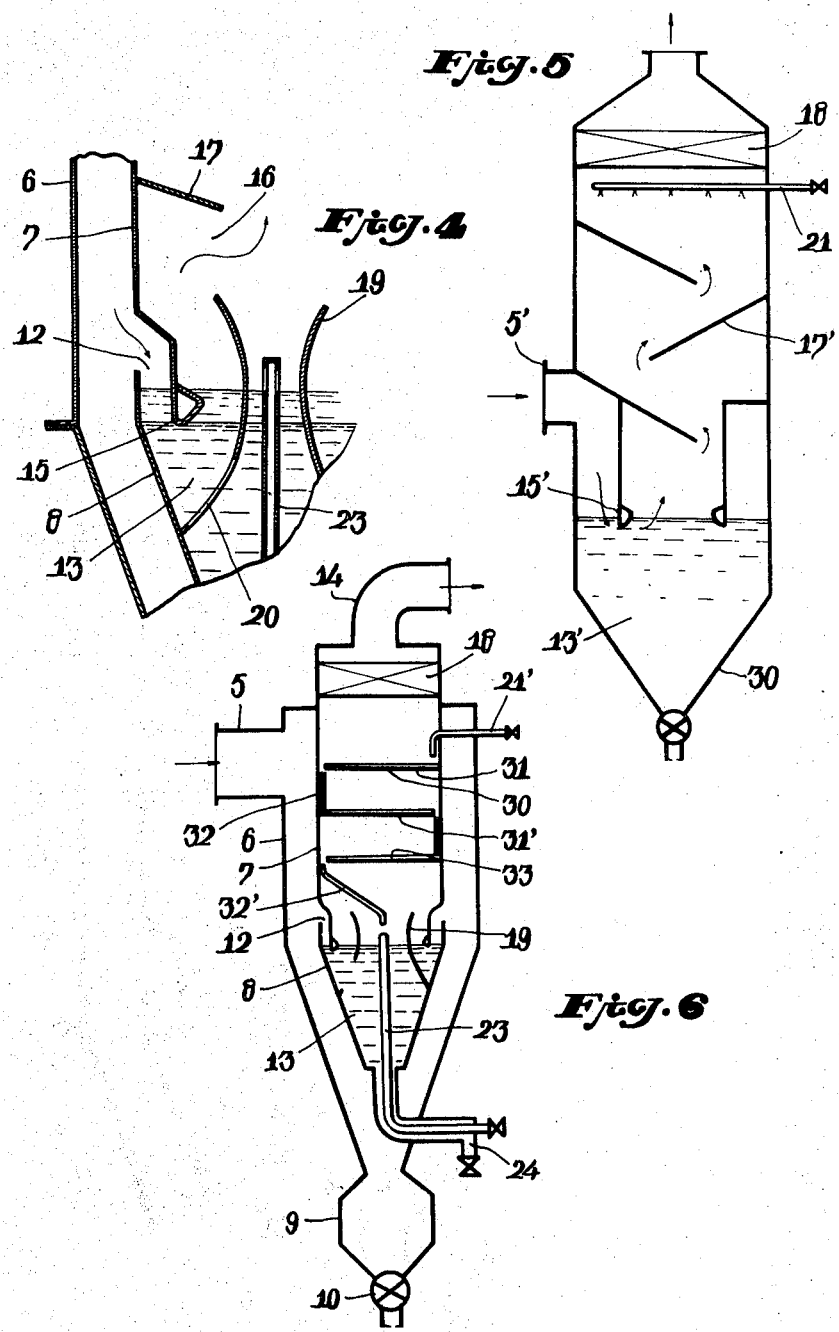

United States Patent Office 3,527,026
Patented Sept. 8, 1970

3,527,026
APPARATUS FOR TREATING A GAS TO
REMOVE IMPURITIES THEREFROM
Mitsugi Miura, 13 Tezukayama-Higashi 2-chome,
Sumiyoshi-ku, Osaka, Japan
Filed June 3, 1968, Ser. No. 734,116
Int. Cl. B01d 47/02
U.S. Cl. 55—236                      4 Claims

ABSTRACT OF THE DISCLOSURE

A cyclone provided with spray means in the gas discharge pipe and including a hopper spaced from the wall of cyclone filled with liquid, the gas discharge pipe extending into the liquid.

---

The present invention relates to an apparatus for treating a gas to remove particles and poisonous gases contained therein and a device used for such treatment. More particularly, the present invention relates to an apparatus for efficiently separating or recovering fine particles contained in a gaseous substance. Generally speaking, the present invention contemplates employing a dry-method and a wet-method separator, to efficiently separate or recover fine particles and poisonous gases generated at a chemical plant, food plant, machinery plant, an iron works, an electric power station and similar establishments. Furthermore, the present invention makes such treatment possible without lowering the temperature of the exhaust gas very much, especially, when the gas is at a high temperature. In the past, when fine particles and poisonous gases contained in gaseous body were to be separated, a cyclone was used to separate a large part of the fine particles. But that portion of the particles which were not separated by the cyclone was sometimes separated by a bag filter, by an electrostatic precipitator, or, in most cases, by a wet-method separator such as a washing absorbing tower, venturi-scrubber and similar devices. Thus, both the dry-method and the wet-method were usually employed. Since a dry-method cyclone and a wet-method separator were both used, the cost of installation was high and a large floor space was needed. Further, this arrangement has two defects: First, when a wet-method separator such as a washing absorbing tower or a venturi-scrubber is employed, a large quantity of water is used. Consequently, a waste water treating device is needed. Secondly, when high temperature gas is generated at an electric powerstation, an electric furnace or others such installations and treated by the known wet-method separator arrangement, the temperature of the exhaust gas is lowered appreciably and the gas, after its discharge from the chimney, falls around the chimney, and poisonous gas containing carbon monoxide or untreated sulfur dioxide gas pollutes the air of the surrounding area and causes a nuisance. The present invention contemplates a method of treatment and an apparatus for such treatment wherein these defects are eliminated. In the apparatus of this invention a dry-method cyclone and a wet-method separator are combined into one unit. The contemplated apparatus consists of a dual cyclone of the dry-method and the wet-method which works simultaneously as a dry-method and wet-method. When impurities contained in the gaseous body are treated, a large part of the particles are separated and recovered by the dry-method device, and fine particles or poisonous gas left over are eliminated by effectively contacting them with a small quantity of water or of solution reactive to poisonous gas by the wet-method device.

The invention as well as the objects and advantages thereof will become more apparent from the following detailed description when taken together with the accompanying drawing, in which:

FIG. 1 shows a diagram of a dry-method cyclone and a wet-method washing tower arranged in series as conventionally employed.

FIG. 2 illustrates in a vertical cross-section a working example of the present invention.

FIG. 3 shows a cross-section viewed from the line 3–3' in FIG. 2.

FIG. 4 shows a magnified partial plan view of FIG. 2.

FIGS. 5 and 6 show a vertical cross-section of other embodiments of the invention.

FIG. 1 illustrates the theory of the conventional arrangement wherein air containing solid substances and poisonous gas is tangentially drawn into a cyclone 1. The contained large-sized solid substances are separated centrifugally and precipitated. On the other hand, the fine particles are little affected by the centrifugal force and can not be separated. Likewise, the poisonous gas is not affected by the centrifugal force. The air including fine particles and poisonous gas moves up again from the lower part of the cyclone and pass out through the exhaust pipe in the center of the cyclone. Thus, the cyclone separates only solid substance which are centrifugally separable by the dry-method. Consequently, air containing fine particles or poisonous gas which could not be separated by the cyclone passes into the wet-method washing-tower 3 where fine particles and poisonous gases are brought into contact with liquid sprayed from a sprayer 4. In this invention, there is a gas-liquid contacting device in the bottom part of cyclone, in the inner cylinder of cyclone or in the both, without much changing its construction having both the mechanisms of the dry and wet-methods, so that fine particles and poisonous gas contained in gas can be wetted, absorbed, separated and eliminated.

Thus, in FIGS. 2, 3 and 4 the gas to be treated is tangentially passed into the gap between the inner and outer cylinders 6 and 7 through inlet tube means 5. While the gas moves down in a spiral motion in the gas between the outer and inner cylinders, solid substances contained in the gas are separated in the inner wall of the outer cylinder 6 by centrifugal force, and such separated substances are recovered to recovery tank 9 through a part formed by the lower portion of the outer cylinder 6 and outer wall of liquid tank 8, which part is completely free from contacting with liquid. The recovered solid substances are taken out of the exhaust pipe of the apparatus through an exhaust valve 10, such as a revolving valve, suitable for this work. Very fine particles which are little affected by centrifugal force, or such poisonous gas as sulfur dioxide gas which are not affected at all by centrifugal force go through the gas passage 12 located between the inner cylinder and the outer wall of the liquid tank. This flow stream then comes into contact with the water or solution 13 contained in the liquid tank 8, and the particles are caught in the liquid, poisonous gases are treated by the liquid, while the purified gas is let out through the purified gas outlet 14.

When not in operation liquid tank 8 is filled with liquid to around the lowest portion of the flue-type guide plate 15 at the bottom of the inner cylinder 7. When in operation a thin gap is formed between the lower end of the guide plate and the surface of the water and through this gap the gas turns to rise up, at this moment impurities contained in the gas contact the liquid and are first caught. Next, the impurities contact the droplets floating in mist-chamber 16 of the inner cylinder which were formed by the ascending air currents, and here they are caught again. The dust-containing mist or poisonous gas-contained mist are separated by a separator such as a mist-separator 18 which may also include baffle plates 17 and 17' or an impact mechanism or an inertia mechanism. The dust-containing mist and poisonous-gas containing mist fall naturally into the center which is enclosed by curved separation plate 19 placed opposite to the guide plate and the dust-containing mist then flows back again into the liquid tank. A connecting aperture 20 (FIG. 4) is provided under the separation plate 19 and maintain fallen liquid in circulation as a jet liquid by an ascending air current. The surface of the liquid in the liquid tank drops by evaporation and entrainment, so the surface of liquid 15 is constantly kept at a predetermined level by feeding in an amount equal to the volume of liquid lost by evaporation and entrainment through spray pipe 22 and feed pipe 21.

A liquid surface-controlling meter is used for feeding spray to keep the surface constantly at the same level e.g., by using means equal to feeding the volume lost. Thus in this invention the liquid volume is kept constant catching fine particles coming in continually, and as time goes on, the concentration of the suspension increases. When this concentration grows excessively, concentrated sludge in liquid tank 8 is intermittently or continually removed by the action of sludge outlet pipe 24 and fresh liquid is fed in.

As is readily apparent from the foregoing, in the system described the concentration of particles in suspension becomes larger and consequently, does not require as much water drainage as compared with the conventional apparatus so that the drainage treatment is considerably lightened. The liquid in the liquid tank 8 is taken out through sludge outlet pipe 24 and the solid substance contained is eliminated as filter cake by filtering. The filtered liquid may be used again as a feeding liquid through the feed pipe 21.

The arrangement is highly efficient when the temperature of the gas to be treated is very high. Thus, when a high temperature gas is sent in, the liquid in the liquid tank soon reached the boiling point, and if high temperature gas continues to be sent in, the liquid in the liquid tank and droplets floating in the mist chamber come into contact with the high temperature gas and are vaporized to steam by the heat of the high temperature gas, and the high temperatuer gas with much steam rises in the inner cylinder at the boiling point of the liquid or above it. The liquid at the boiling point in the liquid tank 8 quickly decreases through its evaporation, but as mentioned above, the volume equivalent of the vaporized volume is fed from the liquid feed pipe 21 and the surface of the liquid is constantly kept at the same level. The feed liquid is sprayed from the upper part of the inner cylinder and again contacts the high temperature gas and eliminates the dust still remaining. If cold water is provided as feed liquid, a part of the vapor condenses into droplets. These droplets contact the dust particles forming agglomerated large particles of heavy weight which are easy to separate.

The liquid in liquid tank 8 does not have to be gradually heated to the boiling point by the heat of the high temperature gas, but it may be a liquid already heated to the boiling point or nearly boiling.

When the high temperature gas contains such poisonous gases as sulfur dioxide gas etc., a solution reactive to poisonous gases, e.g., a calcium hydroxide solution in case of sulfurous acid gas, is used for the liquid in the liquid tank 8. Sulfur dioxide gas and the like when in high temperature gas contact with a calcium hydroxide solution or similar solutions at or near the boiling point quickly react owing to the high temperature, and a part of the solution is vaporized by the heat capacity of the high temperature gas leaving a concentrated solution or slurry.

What is described in the above relates to a dry and wet method apparatus, in the case of containing larger particle dust other than the fine particle dust and/or the poisonous gases at the same time, wherein after the larger particles of dust is separatingly collected at the dried state through the outer cylinder by the centrifugal force like the conventional method, the fine particles or the high temperature poisonous gases which are free from an affect of the centrifugal force can be also removed by the wet-method apparatus having contacted with a liquid in the boiling point, however, in the case not containing the larger particles but only fine particles or the poisonous gases which unrelate to a centrifugal force, the removing process for the larger particles can be omitted by employing a contacting method between the high temperature gases and the liquid 13 within the liquid chamber 30 in direct as shown in FIG. 5 so that an object of the present invention can be achieved at lower installation expense.

Namely, the fine particles or the poisonous gases fed from an inlet 5' may contact with the liquid surface in direct without being necessary of centrifugal separation. Moreover, the treatment allows them to contact efficiently with the fine liquid drops generated from an effect of an ascending current through the guide plate 15'.

In this case, this high temperature gas evaporates the liquid in the liquid chamber 30 and a part of the diffused fine liquid particles by its temperature and afterwards is exhausted to atmosphere above the boiling temperature and containing steam.

In contrast to the conventional wet method in which a large quantity of cold or room temperature washing and absorbing solution is used, in the present system, liquid at or near the boiling point is made to contact with high temperature gas, and consequently, the exhaust temperature is kept at or above the boiling point of the liquid so that the phenomenon of a descending gas current after coming out of the factory chimney is avoided, and the suction force of the exhaust does not diminish very much. On the other hand, the washing and reactive solution react with the dust and the poisonous components containing in the high temperature gas, and a part of the water vaporizes and the liquid is kept constantly at the same level by feeding in the amount of the vaporized water, while the concentrated solution or slurry can be readily recovered.

In the embodiment of FIG. 6 is a construction with built-in buffer plates 31, 31' having a metal mesh or porous plate instead of the buffer plates 17, 17' within the inner cylinder shown in FIGS. 2 and 3, and it assures more effective gas liquid contact in the inner cylinder.

Thus, in the inner wall of the outer cylinder 6, purified gas of which impurities were mostly removed passes through the passage 12 and rises in the inner cylinder 7 upon contacting the liquid within the liquid tank 8. The gas further passes through capillary passages 30 provided in the buffer plates 31, 31' so as to discharge fine liquid drops and the remaining impurities are forced to contact the liquid drops because of the nozzle effect of the capillary passage 30.

In this case, however, there may be expected an enhanced effect by adding liquid to be fed into a liquid pool by the buffer plate 31, through feed pipe 21'. A thin liquid film is constantly formed with liquid fed from the peripheral connecting pipes 32 and 32' and the ascending gas in the inner cylinder contacts the thin liquid film when it passes through the capillary passages 30.

The equipment of the present invention as hereinbefore stated, comprise using a single cyclone having a double effect of the dry and the wet-methods apparatus. The apparatus houses a dry-method cyclone and wet-method separator, therefore, it has the advantage of not requiring the installation of separate pieces of equipment.

This saves a good deal of construction expenses, waste water treatment expenses, floor space, and besides, it can effectively eliminate solid substance and poisonous gas contained in the gaseous body.

Although the present invention has been described in conjunction with preferred embodiments, it is to be understood that modifications and variations may be resorted to without departing from the spirit and scope of the invention, as those skilled in the art will readily understand. Such modifications and variations are considered

What is claimed is:

1. An apparatus for the removal of impurities from a flowing stream of gas, comprising in combination:
- an elongated vertically disposed outer cylinder having a tangential inlet adjacent to the upper end of said cylinder for admitting a gas stream to be purified, into said cylinder;
- a frustoconical portion depending from said cylinder and constituting a downwardly extending extension thereof, said frustoconical portion terminating in an outlet for discharging solids separated from said stream of gas;
- a smaller inner cylindrical clean gas discharge conduit disposed within said outer cylinder, coaxially therewith, and having an upper end extending through a top wall closing the top of said outer cylinder and having a lower end extending downwardly and offset inwardly of said smaller cylinder;
- a frustoconical hopper positioned below said smaller cylinder and within the frustoconical portion depending from the outer cylinder, said hopper having an outlet at the bottom, and extending through a wall of said first frustoconical portion for the discharge of sludge, there being a clearance between an upwardly extending open end of said hopper and the downwardly extending inwardly offset open end of said clean gas discharge conduit which clearance serves as an inlet for the stream of gas after it has become partially rid of solids originally present in the gas, admitting said gas into said clean gas discharge conduit through which said gas ascends towards said clean gas discharge outlet;
- spray means positioned in the upper portion of said clean gas discharge conduit delivering liquid across the entire section of said clean gas discharge conduit; and
- a body of liquid confined in said frustoconical hopper and extending across the inlet for the stream of gas into said clean gas discharge conduit, the inwardly offset open end of said clean gas conduit being immersed in said body of liquid, whereby the gas to be purified passes through said body of liquid before entering said clean gas discharge conduit.

2. The apparatus of claim 1 including in addition at least one baffle plate extending transversely into the passage in said clean gas discharge conduit to impede the upward passage of solids in said conduit.

3. The apparatus of claim 1 including in addition a plurality of baffle plates in said clean gas discharge conduit which are angularly disposed and which overlap radially.

4. The apparatus of claim 1 wherein said spray means is horizontally disposed adjacent the top of said clean gas discharge conduit.

References Cited

UNITED STATES PATENTS

| | | | |
|---|---|---|---|
| Re. 16,315 | 4/1926 | Senseman | 55—92 |
| 1,264,263 | 4/1918 | Brassert | 55—236 |
| 1,844,849 | 2/1932 | Harmon | 55—85 |
| 1,895,652 | 1/1933 | Fisher | 261—79.1 |
| 2,349,777 | 5/1944 | Utterback et al. | 55—85 |
| 2,565,596 | 8/1951 | Cox | 55—239 |
| 3,054,244 | 9/1962 | Hersh | 55—94 |
| 3,064,408 | 11/1962 | Erga et al. | 55—94 |
| 3,075,578 | 1/1963 | Sumiya | 55—260 |
| 3,113,168 | 12/1963 | Kinney. | |
| 3,225,523 | 12/1965 | Wiebe | 55—238 |
| 3,323,290 | 6/1967 | Stern | 55—94 |
| 3,324,632 | 6/1967 | Berneike et al. | 55—236 |
| 3,412,529 | 11/1968 | Tailor | 55—94 |

FOREIGN PATENTS

| | | |
|---|---|---|
| 1,283,787 | 12/1961 | France. |
| 449,956 | 7/1936 | Great Britain. |
| 870,812 | 6/1961 | Great Britain. |
| 166,243 | 2/1959 | Sweden. |

FRANK W. LUTTER, Primary Examiner

B. NOZICK, Assistant Examiner

U.S. Cl. X.R.

55—239, 250, 259, 260; 261—79